(12) United States Patent
Abramov et al.

(10) Patent No.: US 8,171,753 B2
(45) Date of Patent: May 8, 2012

(54) METHOD FOR CUTTING A BRITTLE MATERIAL

(75) Inventors: Anatoli A. Abramov, Painted Post, NY (US); Weiwei Luo, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 282 days.

(21) Appl. No.: 12/621,068

(22) Filed: Nov. 18, 2009

(65) Prior Publication Data

US 2011/0113830 A1    May 19, 2011

(51) Int. Cl.
*C03B 33/09* (2006.01)

(52) U.S. Cl. ........... 65/176; 65/105; 65/174; 65/97; 219/121.72

(58) Field of Classification Search ........ 65/105, 65/174, 176, 97; 219/127.72
See application file for complete search history.

(56) References Cited

U.S. PATENT DOCUMENTS

| | | | |
|---|---|---|---|
| 2,589,183 A | | 3/1952 | Zielinski |
| 3,773,260 A | * | 11/1973 | Kunioka et al. ............. 239/10 |
| 4,141,507 A | | 2/1979 | Rump |
| 5,011,083 A | | 4/1991 | Matsumoto et al. |
| 5,609,284 A | | 3/1997 | Kondratenko |
| 6,211,488 B1 | | 4/2001 | Hoekstra et al. |
| 6,252,197 B1 | | 6/2001 | Hoekstra et al. |
| 6,259,058 B1 | | 7/2001 | Hoekstra |
| 6,327,875 B1 | | 12/2001 | Allaire et al. |
| 6,407,360 B1 | | 6/2002 | Choo et al. |
| 6,420,678 B1 | | 7/2002 | Hoekstra |
| 6,489,588 B1 | | 12/2002 | Hoekstra et al. |
| 6,590,181 B2 | | 7/2003 | Choo et al. |
| 6,660,963 B2 | | 12/2003 | Hoekstra et al. |
| 6,710,843 B2 | | 3/2004 | Choo et al. |
| 6,723,952 B2 | | 4/2004 | Choo et al. |
| 6,744,009 B1 | | 6/2004 | Xuan et al. |
| 6,800,831 B1 | | 10/2004 | Hoetzel |
| 7,185,833 B2 | | 3/2007 | Geskin et al. |
| 2002/0170895 A1 | | 11/2002 | Hauer et al. |
| 2003/0209528 A1 | | 11/2003 | Choo et al. |
| 2004/0255599 A1 | * | 12/2004 | Moller et al. ............... 62/64 |
| 2005/0029239 A1 | | 2/2005 | Matsumoto et al. |
| 2005/0029321 A1 | | 2/2005 | Hauer et al. |
| 2006/0266195 A1 | | 11/2006 | Hoetzel et al. |
| 2007/0140311 A1 | * | 6/2007 | House et al. ............... 374/100 |
| 2008/0135650 A1 | | 6/2008 | Starke |
| 2008/0213978 A1 | | 9/2008 | Henry et al. |

(Continued)

FOREIGN PATENT DOCUMENTS

EP    0633867 B1    8/1996

(Continued)

OTHER PUBLICATIONS

M.N. Morgan, et al., "Optimisation of fluid application in grinding", CIRP Annals—Manufacturing Technology, vol. 57, 2008, pp. 363-366.

(Continued)

*Primary Examiner* — Queenie Dehghan
(74) *Attorney, Agent, or Firm* — Kevin M. Able

(57) ABSTRACT

A method of scoring and/or separating a brittle material is described comprising heating a surface of the brittle material along a predetermined path with a laser, then quenching the heated surface with a stream of cooling liquid, such as water, formed by a nozzle. The portion of the cooling stream impinging on the surface of the brittle material is a substantially columnar flow.

20 Claims, 3 Drawing Sheets

U.S. PATENT DOCUMENTS

| | | | |
|---|---|---|---|
| 2008/0276646 A1* | 11/2008 | Chalk et al. | 65/17.2 |
| 2008/0283509 A1 | 11/2008 | Abramov et al. | 219/121.72 |

FOREIGN PATENT DOCUMENTS

| | | |
|---|---|---|
| EP | 0585694 B1 | 12/1997 |
| EP | 0782548 B1 | 12/2001 |
| EP | 0847317 B1 | 8/2003 |
| EP | 1690835 A1 | 8/2006 |
| JP | 6246930 | 2/1987 |
| WO | 9320015 A1 | 10/1993 |
| WO | 9609254 A1 | 3/1996 |
| WO | 9707927 A1 | 3/1997 |
| WO | 2006023133 A2 | 3/2006 |
| WO | 2006118809 A2 | 11/2006 |
| WO | 2007018586 A1 | 2/2007 |
| WO | 2007039082 A1 | 4/2007 |
| WO | 2008057192 A2 | 5/2008 |
| WO | 2008133800 A1 | 11/2008 |
| WO | 2008140818 A2 | 11/2008 |
| WO | 2008147510 A1 | 12/2008 |
| WO | 2009029901 A1 | 3/2009 |
| WO | 2009067164 A1 | 5/2009 |
| WO | 2009091510 A1 | 7/2009 |

OTHER PUBLICATIONS

W. Friedl, "On-line laser cutting of the float ribbon", Verre, vol. 11, No. 6, Dec. 2005, pp. 35-38.

* cited by examiner

METHOD FOR CUTTING A BRITTLE MATERIAL

TECHNICAL FIELD

This invention is directed to a method of scoring and/or separating a brittle material, such as a glass or ceramic material.

BACKGROUND

One method of cutting a brittle material includes making a mechanical score on a surface of the brittle material. The score can produce a small crack that extends essentially perpendicular to the surface of the material, and may sometimes be referred to as a vent crack or simply vent. Stress applied to the score line, such that a tension stress is produced across the score line (and consequently the vent crack), grows the vent so that it extends across the full thickness of the material, thereby separating the material into several pieces. The stress may be applied, for example, by bending the material, hence a term often applied to the technique is "score and snap".

The mechanical score and snap method, wherein a score is produced by the mechanical application of a hard scoring wheel or scribe, suffers in that substantial damage is done to the surface, and to some meaningful depth into the brittle material, so that the edges of the separated pieces are weakened by the presence of small cracks or chips produced during the scoring.

To alleviate this damage, laser scoring techniques were developed that used a laser beam to form a score line, after which stress was again applied. According to this technique, a surface of the brittle material was heated by a laser beam. A cooling fluid was then applied to the heated glass, and the accompanying high stress was capable of producing a rupture of the brittle material at the surface thereof and forming a vent crack. Separation occurred after the subsequent application of a bending stress. Variations of the technique include so-called full body separation wherein, instead of first forming a score line, the heating and cooling is sufficient to produce a vent that extends through the full thickness of the brittle material without the application of a subsequent bending stress. While laser scoring has proved to be superior to mechanical scoring, the technique suffers from inconsistencies, largely as a result of the cooling phase.

SUMMARY

A method of separating a brittle material, such as a sheet of glass, is disclosed. The method employs a laser to heat the brittle material along a predetermined path, followed by a stream of a cooling fluid, for example, water, produced by a nozzle that cools the heated predetermined path. The nozzle is capable of producing a stream that is substantially columnar (i.e. substantially cylindrical) for at least about 30 mm, preferably in excess of 50 mm. The length of the columnar portion of the stream is referred to as the coherence length of the stream. It has been found that consistency of the separation process, such as in the straightness of the score or cut, uniformity of the vent depth and overall process repeatability can be significantly increased if the coherent portion of the stream contacts the brittle material along the heated predetermined path.

In one embodiment, a method of forming a vent crack in a brittle material comprising heating a surface of the brittle material with a laser along a predetermined path, cooling the heated surface of the brittle material with a coherent stream of cooling liquid dispensed by a nozzle, the stream comprising a coherence length equal to or greater than 50 mm and a diameter in the range from about 70 micrometers to about 150 micrometers and wherein a working distance between the nozzle aperture and the surface of the brittle material is less than the coherence length of the stream.

Preferably, the coherent stream of cooling liquid is formed by a convergent nozzle with a circularly symmetric aperture. In other embodiments the coherent stream of cooling liquid is formed by a nozzle having a straight walled orifice with a circularly symmetric aperture. The working distance between the aperture of the nozzle and the surface of the brittle material is greater than 5 mm, and in some instances can be in excess of 50 mm.

The brittle material may be glass, and in some embodiments is a continuous ribbon of glass, such as might be produced in a fusion downdraw process.

If the brittle material is to be separated by the application of a mechanical stress, the vent crack may comprise a score (score line). In this instance, a tension stress may be produced across the score line by bending, or a tension may be produced by applying a linear force on the material (for example, by applying a pulling force).

In other cases, the vent crack can extend through a full thickness of the brittle material after the cooling such that the brittle material is separated.

Some applications of the method comprise separating a glass ribbon, wherein the ribbon has a temperature that exceeds 300° C. The ribbon may be non-planar, in which case the long working distance (e.g. long coherence length) of the stream allows for cutting and/or scoring without adjusting the position of the nozzle relative to the surface of the ribbon. That is, the distance between the nozzle aperture and the surface of the brittle material varies along the predetermined path, but without significant effect on the character of the formed vent crack.

Preferably, a pressure of the cooling liquid in the nozzle is in a range between about 0.35 kg/cm$^2$ and about 0.70 kg/cm$^2$.

In another embodiment, a method of separating edges of a glass ribbon is disclosed comprising forming a continuous ribbon of glass, the continuous ribbon of glass comprising a viscous region and an elastic region, heating a surface of the continuous ribbon of glass in the elastic region with a laser along a predetermined path. The heated predetermined path is then cooled with a coherent stream of cooling liquid dispensed by a nozzle, the stream comprising a coherence length equal to or greater than 50 mm and a diameter in the range from about 70 micrometers to about 150 micrometers to separate an edge from the continuous ribbon of glass. A working distance between the nozzle aperture and the surface of the continuous ribbon of glass is less than the coherence length of the stream.

In some instances a temperature of the continuous ribbon of glass in the elastic region before the heating is greater than about 300° C. Preferably, the working distance between the nozzle aperture and the surface of the continuous ribbon of glass is greater than about 5 mm. Preferably, the pressure of the cooling liquid in the nozzle is in a range between about 0.35 kg/cm$^2$ and about 0.70 kg/cm$^2$. The nozzle preferably comprises a divergent, circularly symmetric orifice or a straight walled, circularly symmetric orifice In some embodiment, the continuous ribbon of glass in the elastic region is non-planar.

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods, features and advantages be included within this description, be within the scope of the present invention, and be protected by the accompanying claims.

DETAILED DESCRIPTION

Figure 1:
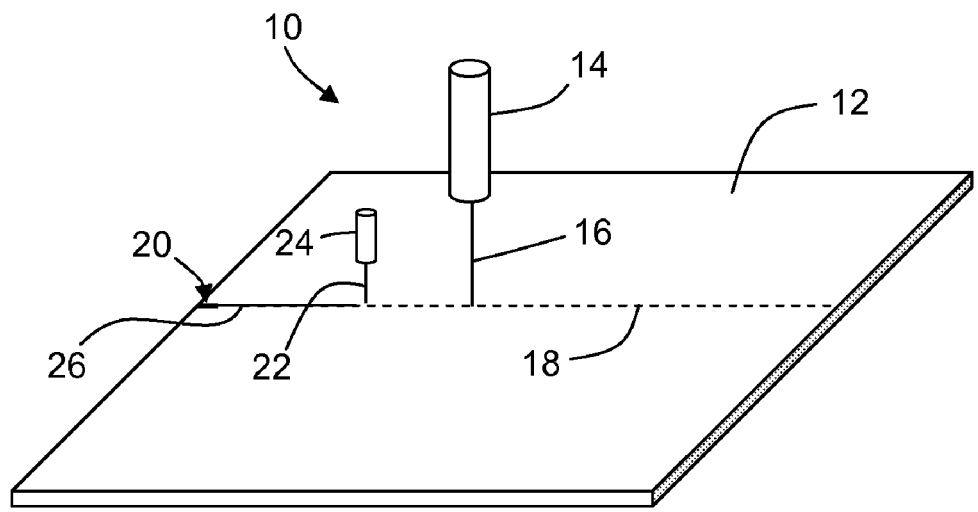
FIG. 1 is a perspective view of a laser scoring and/or cutting apparatus.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

While laser scoring techniques employing a laser to first heat a brittle material along a predetermined line and wherein the heated zone on the brittle material is immediately cooled by a cooling fluid, are well known in the art. However, while laser scoring is superior to mechanical scoring techniques in terms of the resultant edge strength, they may suffer from inconsistencies in the vent crack formation that can lead to wander of the vent (undesired changes in the vent propagation direction at the surface of the brittle material) and variations in the vent propagation in a direction transverse to the surface. More simply, the depth of the vent crack can vary, resulting in a variation in the quality of the edge surface of the finally separated individual pieces. This inconsistency can be traced to the nature of cooling.

Shown in FIG. 1 is an exemplary laser scoring an/or cutting apparatus 10 used to score or cut (e.g. full body cut) a sheet of brittle material 12, such as a sheet of glass, glass ceramic or ceramic, comprising a laser 14 that produces a beam of electromagnetic energy (light) 16 that irradiates and heats a portion of the sheet along a predetermined path 18. In some embodiments, the predetermined path originates with a pre-existing flaw 20 formed at an edge of the sheet. The heated portion of the sheet is subsequently cooled by a closely following stream of cooling fluid 22 discharged by a nozzle 24. The heating, followed immediately by rapid cooling, produces high stress in the sheet that drives a crack 26, such as produced by the pre-existing flaw, into the sheet and along the predetermined path.

Figure 2:
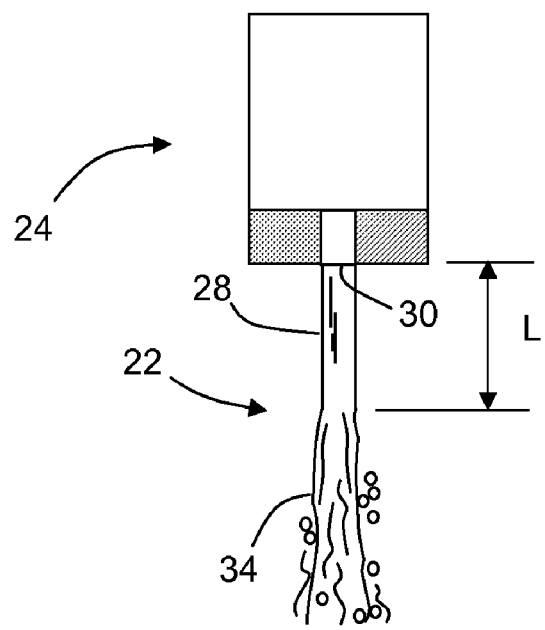
FIG. 2 is a side view of a stream of water discharging from a straight walled nozzle showing the coherent portion and the non-coherent portion.

A liquid stream 22 produced by a simple nozzle opening goes through at least several phases depicted in FIG. 2. Assuming a circular aperture, the stream begins as a substantially columnar flow 28 with little turbulence or surface degeneration (e.g. breakup at the stream surface leading to orphaned droplets, surface ripples etc.) and minimal entrained voids or bubbles over a distance L.

Figures 3A, 3B, 3C:
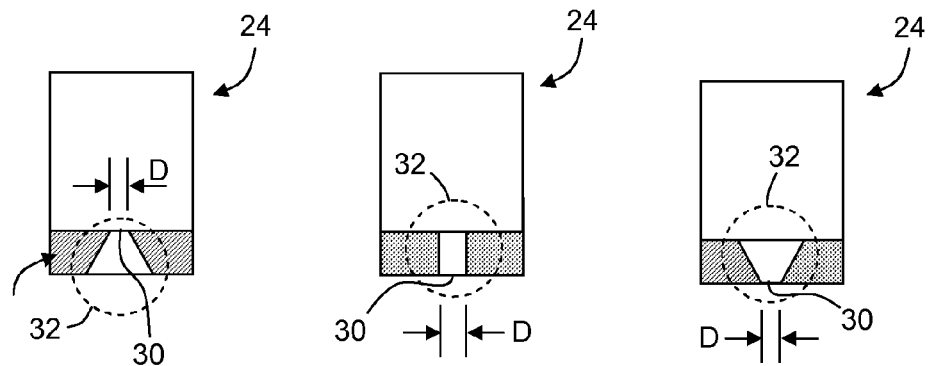
FIGS. 3A-3C illustrate three simple nozzles, a divergent nozzle, a straight walled nozzle and a convergent nozzle, respectively.

By simple nozzle what is meant is a single, circularly symmetric orifice. Three simple orifices are shown in FIGS. 3A-3C. FIG. 3A illustrates a divergent nozzle 24, wherein the liquid leaving the nozzle aperture 30 immediately traverses an orifice 32 that rapidly expands in the form of a cone. FIG. 3B illustrates a straight walled nozzle 24 wherein the walls of the orifice 32 are substantially parallel. Finally, FIG. 3C depicts a convergent nozzle 24, wherein the liquid first traverses a converging cone-shaped portion of orifice 32 before exiting the nozzle aperture 30. For the purpose of eliminating confusion, as used herein nozzle refers to the overall structure of the member that forms the stream, orifice describes the nozzle portion immediately adjacent the aperture (indicated by a dashed circle 32), and aperture 30 refers to the planar geometric shape of the exit pupil from which the fluid exits the nozzle, generally selected as the narrowest portion of the orifice and indicated with a diameter D. As can be seen, each of the nozzles of FIGS. 3A-3C comprises a circular aperture. FIGS. 3A and 3C illustrate conical orifices, while FIG. 3B depicts a cylindrical aperture. For a straight walled nozzle, the aperture and the orifice are the same.

Returning to FIG. 2, in a second phase, the columnar nature of the stream degenerates into a turbulent, disassociated flow of droplets—in short, a non-coherent stream (e.g. a mist) represented by numeral 34. If the mist portion of stream 22 is incident on the surface of the brittle material, inconsistent cooling may occur, leading to unsatisfactory scoring performance, such as deviation from an intended scoring and/or cutting path and weakened edges of the finally separated pieces. Several factors drive both the quality and extent of the columnar, or coherent, portion 28 of stream 22: the quality of the aperture inside edge and the length L of the columnar portion of the stream. As used hereinafter, the term coherent or coherence, shall be used to describe a substantially columnar flow of liquid from a nozzle without significant surface disruption and/or generation of separate (orphaned or accompanying) droplets of liquid originating from the stream surface. More simply put, a coherent flow is a substantially cylindrical flow of liquid, and the length L of this region shall be referred to as the coherence length. The use of a coherent stream of cooling liquid can halve the conventional deviation performance, producing scoring and/or cutting paths with a deviation less than about +/−11 micrometers vs. the typical +/−20 micrometers produced by conventional laser scoring/cutting techniques.

Figure 4:
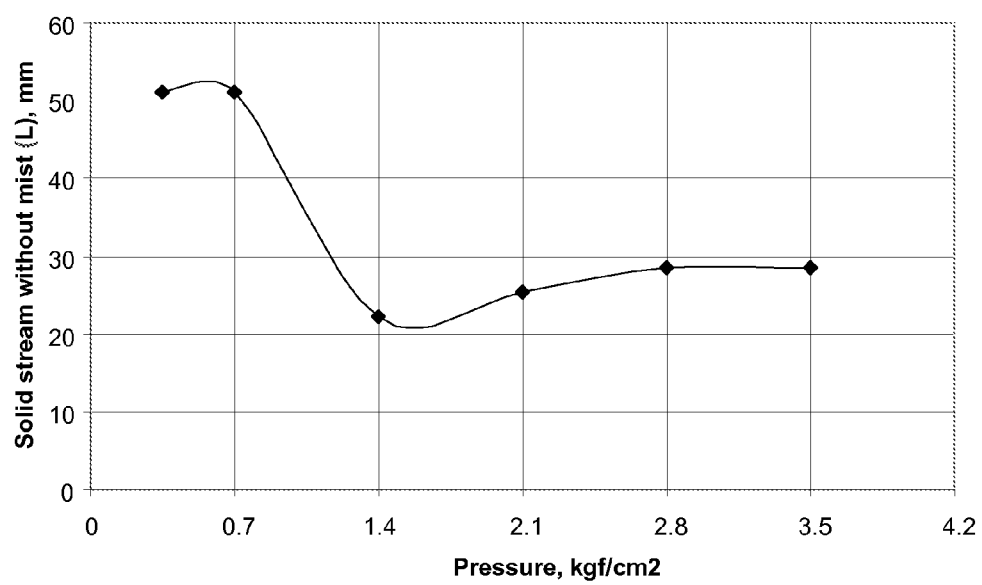
FIG. 4 is a plot of coherence length vs. pressure for an exemplary nozzle having a straight walled cylindrical orifice.

FIG. 4 depicts a plot of coherence length vs. pressure for a stream of water produced by a nozzle with a straight walled cylindrical orifice having an aperture with a diameter D of approximately 200 micrometers. As is evident from the plot, the coherence length of this stream can exceed 50 mm, depending on the pressure driving the liquid. Above a given pressure, the coherence length rapidly deteriorates, reducing the useable working distance. FIG. 4 shows that pressurizing the water (such as with pressurized air) to a pressure between about 0.35 kg/cm$^2$ and 0.70 kg/cm$^2$ results in a coherence length between about 51 mm and 53 mm. A pressure of between about 0.70 kg/cm$^2$ and about 1 kg/cm$^2$ still delivers a respectable coherence length of greater than about 30 mm.

A long coherence length is useful, for example, when scoring and/or cutting a brittle material having an uneven surface. By employing a stream having a long coherence length enables a long working distance between the nozzle aperture and the work piece (brittle material), and movement of the nozzle as the surface topology varies is unnecessary and facilitates faster scoring and/or cutting speed. For example, working distances in excess of 5 mm may be used, such as a working distance in the range between about 10 mm and 50 mm, in a range between 20 mm and 50 mm, in a range between 30 mm and 50 mm or in a range between 40 mm and 50 mm.

In accordance with one embodiment, a surface of a brittle material is irradiated and heated along a predetermined path with a laser beam produced by a laser, and quickly thereafter cooled with a stream of liquid discharged by a nozzle. The nozzle may be, for example, a simple divergent or straight walled nozzle having a circularly symmetric aperture and orifice. A coherence length of the stream is equal to or greater than 50 mm, and a distance between the nozzle aperture and the surface of the brittle material is less than the coherence length of the stream. A diameter of the coherent stream is in the range between 70 micrometers and 150 micrometers.

The use of a coherent stream of cooling liquid also facilitates accurate scoring and/or cutting of brittle material at high temperature, such as separating the edges from a glass ribbon as the high temperature ribbon is drawn from a forming apparatus. The drawing of a glass ribbon is well known in the art, and will not be described in detail, however, such methods include float methods, downdraw methods including fusion downdraw and slot draw, and up draw methods.

Figure 5:
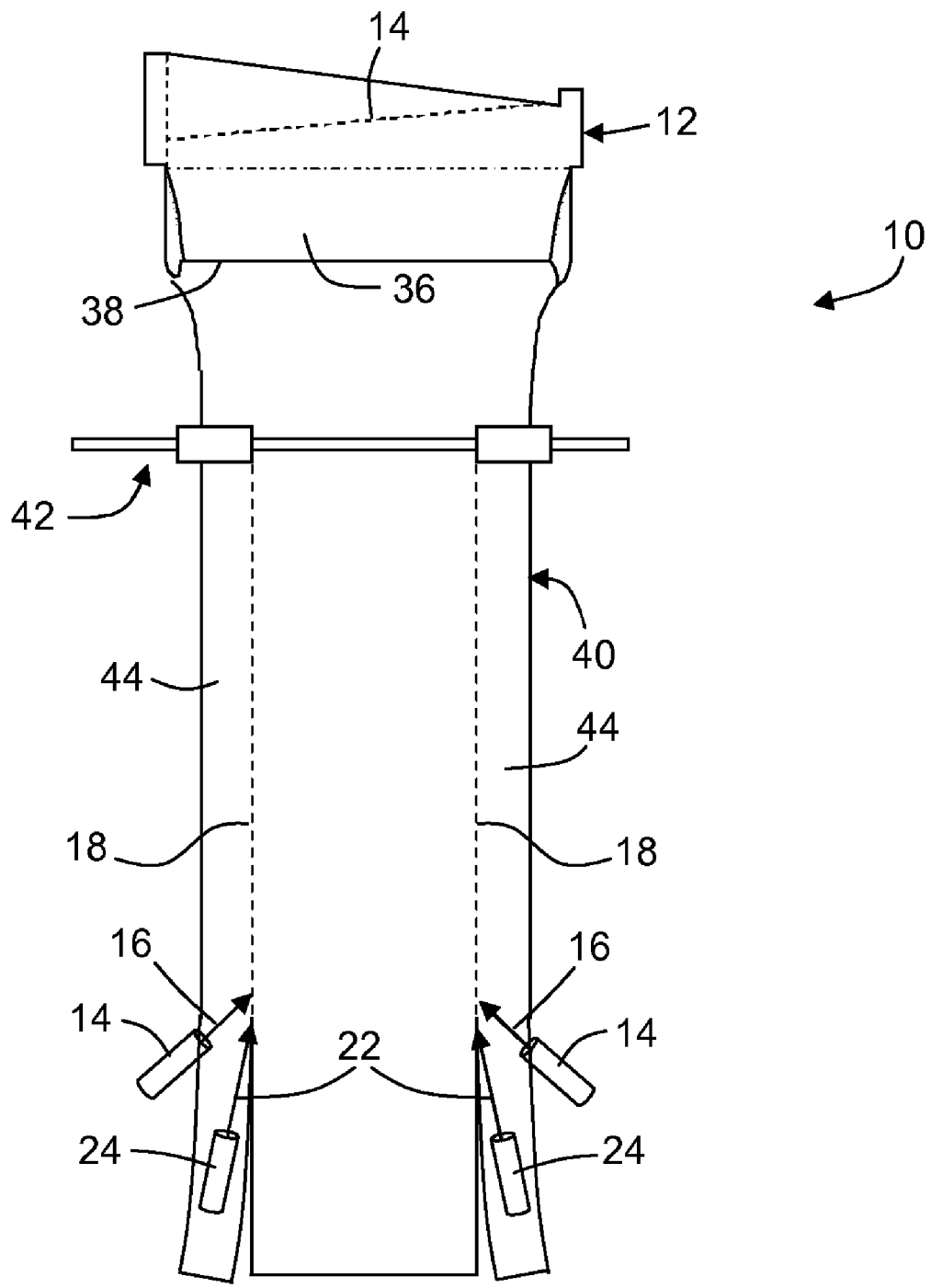
FIG. 5 is a front view of an exemplary fusion downdraw apparatus for producing glass sheet comprising lasers and cooling nozzles for separating edges from a continuous glass ribbon formed by the apparatus.

In an exemplary fusion downdraw method, illustrated in FIG. 5, a molten glass is flowed over converging forming surfaces 36 that meet along a line 38 at the bottom of the forming body, commonly called a root. At the root, the separate streams of molten glass coming from the converging forming surfaces join, or fuse, to form a single ribbon of glass 40. Glass ribbon 40 comprises a viscous region, a visco-elastic region and an elastic region. Glass ribbon 40 is contacted by various edge rolls 42 that grip edges 44 of the ribbon in the viscous and/or visco-elastic region and, depending on their specific function, guide or pull the glass ribbon. The contact between the edge rolls 42 and edges 44 mars the edges and makes the glass unsatisfactory for sale. Consequently, the ribbon edges must be removed. While edge removal can be performed after a separate sheet of glass is removed from the ribbon at the bottom of the draw area, removal of the edges directly from the ribbon offers greater manufacturing efficiency. In accordance with the present embodiment, laser cutting of the ribbon edge portions from the ribbon can be facilitated by employing a laser cutting method that employs a coherent stream of cooling liquid as described above. Laser beams 16 irradiate the glass ribbon along predetermined paths 18 generally parallel to the side edges of ribbon 40 in the elastic region of the ribbon. Next, coherent streams 22 of cooling liquid (e.g. water) are directed along the predetermined paths to separate the edges from the ribbon. A coherence length of the streams is equal to or greater than 50 mm, and a distance between the nozzle apertures and the surface of the ribbon is less than the coherence length of the stream. A diameter of the coherent streams is in the range between 70 micrometers and 200 micrometers, and preferably in the range between 70 micrometers and 150 micrometers. This technique has been successfully demonstrated on non-flat glass ribbon at a temperature in excess of 300° C. in the elastic region of the ribbon and having a bow (deviation from flat) of up to 20 mm.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of forming a vent crack in a brittle material comprising:
    heating a surface of the brittle material with a laser along a predetermined path;
    cooling the heated surface of the brittle material with a coherent stream of cooling liquid dispensed by a nozzle, the coherent stream of cooling liquid comprising a coherence length equal to or greater than 50 mm and wherein a diameter of the coherent stream of cooling liquid is in the range from about 70 micrometers to about 200 micrometers; and
    wherein a working distance between the nozzle aperture and the surface of the brittle material is less than the coherence length of the coherent stream of cooling liquid.

2. The method according to claim 1, wherein the coherent stream of cooling liquid is formed by a divergent nozzle with a circularly symmetric aperture.

3. The method according to claim 1, wherein the coherent stream of cooling liquid is formed by a nozzle having a straight walled cylindrical orifice.

4. The method according to claim 1, wherein the working distance is greater than 5 mm.

5. The method according to claim 1, wherein the brittle material is glass.

6. The method according to claim 5, wherein the brittle material is a continuous ribbon of glass.

7. The method according to claim 6 wherein the continuous ribbon of glass was produced in a fusion downdraw process.

8. The method according to claim 1, wherein the vent crack comprises a score.

9. The method according to claim 1, wherein the vent crack extends through a full thickness of the brittle material after the cooling such that the brittle material is separated.

10. The method according to claim 6, wherein a temperature of the continuous ribbon of glass exceeds 300° C.

11. The method according to claim 6, wherein the continuous ribbon of glass is non-planar.

12. The method according to claim 1, wherein the distance between the nozzle aperture and the heated surface of the brittle material varies along the predetermined path.

13. The method according to claim 1, wherein a pressure of the liquid in the nozzle is in a range between about 0.35 kg/cm$^2$ and about 0.70 kg/cm$^2$.

14. The method according to claim 1, wherein the coherent stream of cooling liquid comprises water.

15. A method of separating edges of a glass ribbon comprising:
    forming a continuous ribbon of glass, the continuous ribbon of glass comprising a viscous region and an elastic region;
    heating a surface of the continuous ribbon of glass in the elastic region with a laser along a predetermined path;
    cooling the heated surface of the continuous ribbon of glass with a coherent stream of cooling liquid comprising water dispensed by a nozzle, the coherent stream of cooling liquid comprising a coherence length equal to or greater than 50 mm and a diameter in the range from about 70 micrometers to about 150 micrometers to separate an edge from the continuous ribbon of glass; and
wherein a working distance between the nozzle aperture and the heated surface of the continuous ribbon of glass is less than the coherence length of the coherent stream of cooling liquid.

16. The method according to claim 15, wherein a temperature of the continuous ribbon of glass in the elastic region before the heating is greater than about 300° C.

17. The method according to claim 15, wherein the working distance between the nozzle aperture and the heated surface of the continuous ribbon of glass is greater than about 5 mm.

18. The method according to claim 15, wherein a pressure of the cooling liquid in the nozzle is in a range between about 0.35 kg/cm$^2$ and about 0.70 kg/cm$^2$.

19. The method according to claim 15, wherein the nozzle comprises a divergent, circularly symmetric orifice.

20. The method according to claim 15, wherein the nozzle comprises a straight walled, circularly symmetric orifice.

* * * * *